May 18, 1965 W. F. KOSONOCKY ETAL 3,184,601

SWITCHING SYSTEMS

Filed Oct. 16, 1958 3 Sheets-Sheet 1

INVENTORS
WALTER F. KOSONOCKY &
LUBOMYR S. ONYSHKEVYCH
BY Morris A. Rabkin
ATTORNEY SWITCHING SYSTEMS
Filed Oct. 16, 1958 3 Sheets-Sheet 2
FIG. 6, FIG. 7
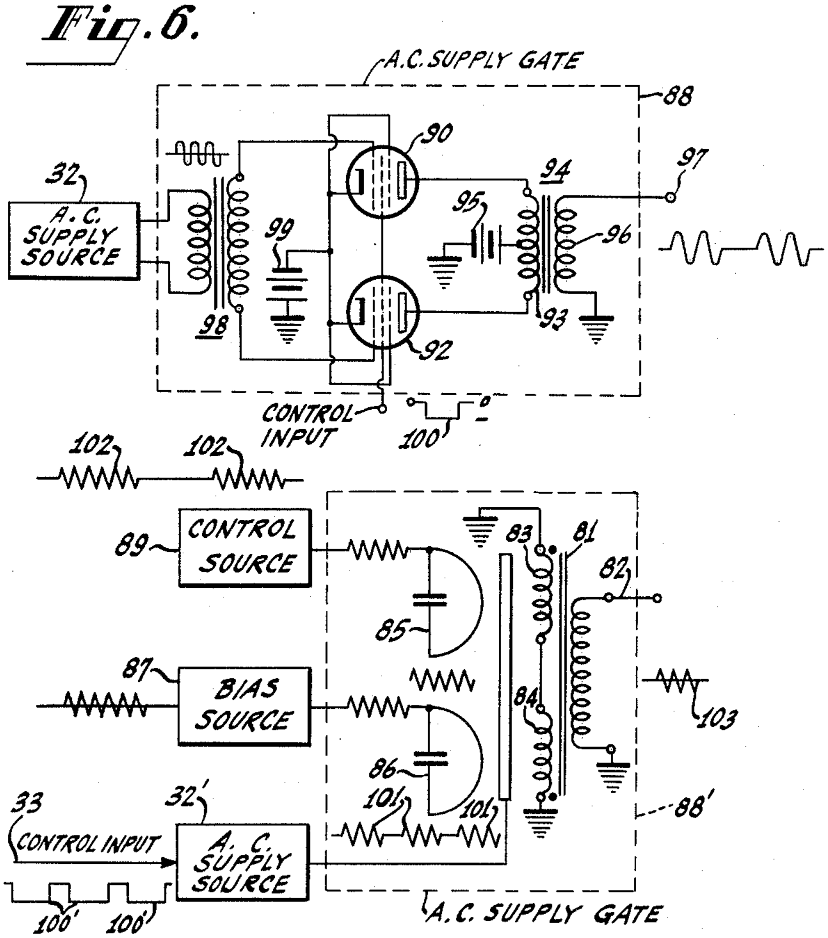
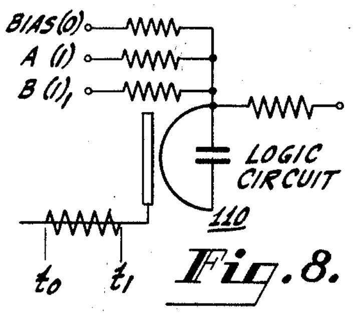
FIG. 8.
FIG. 9.
| B \ A | 1 | 0 | -1 |
|---|---|---|---|
| 1 | 1 | 1 | 0 |
| 0 | 1 | 0 | -1 |
| -1 | 0 | -1 | -1 |
FIG. 10.
| B \ A | 1 | 0 | -1 |
|---|---|---|---|
| 1 | 1 | 1 | 1 |
| 0 | 1 | 1 | 0 |
| -1 | 1 | 0 | -1 |
INVENTORS
WALTER F. KOSONOCKY &
LUBOMYR S. ONYSHKEVYCH
BY
Morris A. Rabkin
ATTORNEY

SWITCHING SYSTEMS

Filed Oct. 16, 1958

INVENTORS
WALTER F. KOSONOCKY &
LUBOMYR S. ONYSHKEVYCH
BY
Morris Rabkin
ATTORNEY 3,184,601

SWITCHING SYSTEMS

Walter F. Kosonocky, Newark, and Lubomyr S. Onyshkevych, Princeton, N.J., assignors to Radio Corporation of America, a corporation of Delaware Filed Oct. 16, 1958, Ser. No. 767,673
20 Claims. (Cl. 307—88)

This invention relates to improved switching systems, and particularly to improved switching systems using parametric oscillator circuits and to novel methods of operating such circuits.

Parametric oscillator circuits make use of a resonant circuit having a non-linear reactance. The phase in which oscillations occur can be controlled by a separate control signal. These circuits are useful in applications involving the switching of information signals from one or more input channels to one or more output channels. The particular function performed by the switching system is controlled by the information signals. For example, in information handling systems, the standard logical gating functions such as "and" gates, "or" gates, combinatorial selection and so on, can be performed by parametric oscillator circuits. In addition, parametric oscillator circuits can provide the functions of storage and amplification.

It is an object of the present invention to provide novel methods of and means for operating parametric oscillator circuits.

Still another object of the present invention is to provide novel methods of and means for controlling the output signals from a parametric oscillator circuit.

Another object of the present invention is to provide improved gating and switching systems using parametric oscillator circuits.

According to the present invention, a parametric oscillator circuit is arranged to selectively supply a "burst" of output signals at its output. In certain cases, the information is determined by the presence or absence of the output burst. In other cases, the information is determined by the phase of the signals of the output burst. The circuits of the invention may be used to generate desired logical functions of a plurality of input signals; the circuits may be used to perform logical gating operations, and combinatorial selection operations.

In the accompanying drawings:

FIGS. 6 and 7 are each a schematic diagram of supply gating circuits useful in the systems of the present invention;

FIG. 8 is a symbolic diagram of a function generator according to the present invention;

FIGS. 9 and 10 are each a table of typical functions which may be generated by the circuit of FIG. 9;

Figures 1, 2, 3, 4:
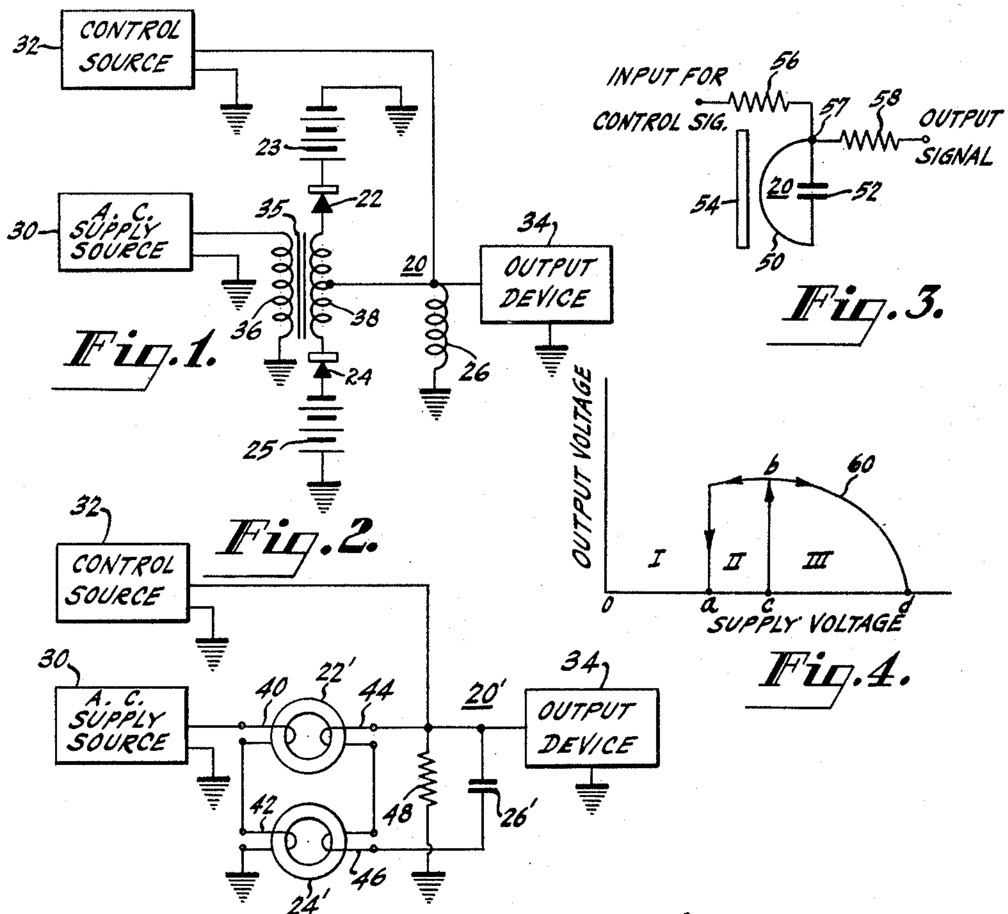
FIGS. 1 and 2 are each schematic diagrams of two different forms of parametric oscillator circuits.
FIG. 3 is a symbolic diagram used to represent a parametric oscillator circuit.
FIG. 4 is the response characteristic of the output voltage of the parametric oscillator circuit of FIG. 2 as a function of supply voltage amplitude.

The parametric circuit 20 of FIG. 1 uses a balanced circuit arrangement of a pair of variable capacity diodes 22 and 24 and a linear inductance 26. The balanced arrangement operates to cancel out the supply source frequency from the output device 34. By appropriate tuning, the resonant frequency of the circuit 20 may be at the fundamental or at a desired harmonic, or subharmonic of the A.C. supply. Conveniently, the circuit 20 is tuned to the second subharmonic (the ½ order harmonic) of the supply frequency. The second subharmonic is preferred in the circuit of FIG. 1 because the conversion of the supply energy to output energy is relatively high at this frequency. Thus, a supply frequency of ($2f$) provides a relatively large output signal at the output frequency ($f$) when the circuit 20 is oscillating.

It is also known in the art that the phase in which the circuit 20 oscillates at the frequency ($f$) can be controlled by control signals of frequency ($f$) applied to the circuit 20 by the control source 32. Two phases of oscillation are of interest in the present invention. These two phases are mutually opposite each other. The two phases respectively correspond to the two binary information signals "1" and "0." The output device 34 may be any suitable device such as a phase discriminating circuit, another parametric oscillator circuit, and so on, responsive to the oscillations of the circuit 20. In certain instances, the output device 34 is responsive to the presence or absence of oscillations of the circuit 20, in certain other applications the output device is responsive to the particular phase of oscillations of the circuit 20, and in still other applications the combination of the presence and the particular phase of the oscillations is of importance.

The diodes 22 and 24 of FIG. 1 are each biased in the reverse direction by a suitable bias source, such as the batteries 23 and 25. The supply source 30 is coupled to the circuit 20 by connecting the primary winding 36 of a transformer 35 to the supply source 30, and by connecting the center-tapped secondary winding 38 to the anode and cathode, respectively, of the diodes 22 and 24. The other electrodes of the diodes 22 and 24 are connected to a common point of reference potential, indicated in the drawing by the conventional ground symbol. The control source 32 is coupled across the inductance 26. The control source 32, the supply source 30 and the output device 34 are each provided with a ground connection. The balanced circuit is provided by connecting the center-tap of the secondary winding 38 of the transformer 35 to one end terminal of the inductance 26. The other end terminal of the inductance 26 is connected to ground. Other known variable capacity elements may be used, such as point contact diodes, capacitors having dielectrics of ferroelectric material, the grid-cathode capacitance of a vacuum tube, and so on.

The non-linear reactance elements 22 and 24 also may be magnetic elements such as the ferromagnetic cores 22′ and 24′ of the parametric oscillator circuit 20′ of FIG. 2. In such case, the linear reactance is provided by a linear capacitor 26′. The balanced circuit arrangement is provided by connecting the input windings 40, 42 of the cores 22′, 24′ in series-aiding relation, and by connecting the output windings 44, 46 of the cores 22′, 24′ in series-opposing relation. The cores 22′ and 24′ are biased to a suitable point on their hysteresis characteristics by a bias source, not shown. The output of the A.C. supply source 30 is connected in series with the input windings 40 and 42. Control signals from the control source 32 are applied to the circuit 20′ by means of a resistor 48 connected across the capacitor 26′. The output device 34 also may be connected across the capacitor 26′, as shown.

For convenience of drawing, the symbolic diagram of FIG. 3 is used to represent a parametric oscillator circuit. In FIG. 3, the non-linear reactance elements are represented by a half circle line 50, and the linear reactance element is represented by a capacitor 52. The A.C. supply source is represented by a rectangle 54 which is placed adjacent to the circular line 50. The control input signals are coupled to the circuit by a resistor 56 connected at a junction point 57 between the circular line 50 and capacitor 52. The circuit of FIG. 3 is provided with a suitable ground connection, not shown. Output signals are taken by way of a resistor 58 connected at the junction 57. A plurality of separate control input signals may be coupled to the common junction point 57.

The amplitude of the output voltage of the parametric oscillator circuit 20 of FIG. 1 as a function of supply voltage is shown by the curve 60 of FIG. 4. The curve 60 is taken for a fixed supply frequency, a given tuning, and a fixed bias voltage. The curve 60 has three distinct operating regions designated I, II, and III. For values of supply between the points $o$ and $a$, region I of the curve 60, the circuit does not oscillate. For values of supply voltage between the points $a$ and $c$, region II of the curve 60, the circuit may or may not be oscillating depending on whether the curve is traversed in the direction of increasing or decreasing voltage. Thus, region II is a hysteresis region requiring a supply voltage of $c$ units before oscillations begin, and, with oscillations once started, continuing until the supply voltage drops below $c$ units. For values of supply voltage between the points $c$ and $d$, region III of the curve 60, the circuit is always oscillating. The transition between non-oscillation and oscillation, and vice versa occur relatively rapidly, and as described more fully hereinafter, the transition time is partially a function of the control signal amplitude.

Figure 5:
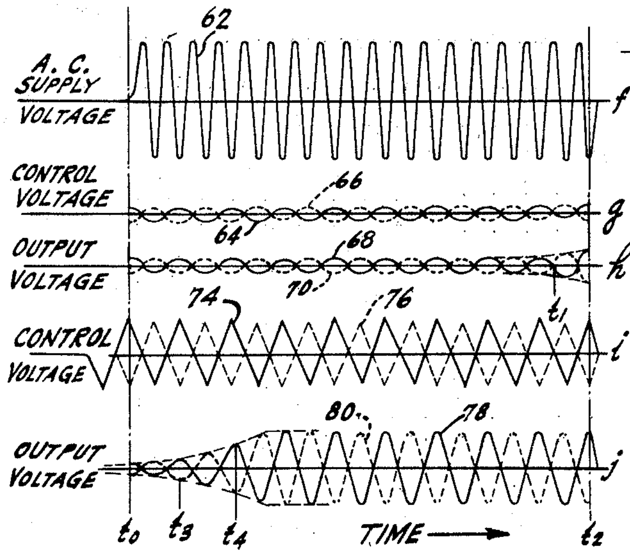
FIG. 5 is a graph of timing waveforms, all on the same time scale, useful in explaining the operation of parametric oscillator circuits according to the present invention.

The waveforms of FIG. 5 illustrate the dependence of the transition time on control signal amplitude. The waveform 62 of line $f$ of FIG. 5 represents the supply input signal. The solid waveform 64 and the dotted waveform 66 of line $g$ represent two control signals of relatively small amplitude, the waveform 66 being 180° out of phase with the waveform 64. The solid waveform 68 and the dotted output waveform 70 of line $h$, respectively, correspond to the output waveforms produced when the control waveforms 64 and 66 are applied. Note that even though the control waveform is applied at time $t_0$, the output waveform of line $h$ does not begin to "build-up" until a later time $t_1$. Between the times $t_1$ and $t_2$, the output waveform builds up exponentially to a maximum value, and thereafter the output remains at the maximum value.

The solid waveform 74 and the dotted waveform 76 of line $i$ of FIG. 5 represent two separate, out of phase control signals of larger amplitude applied to the circuit 20. The solid waveform 78 and the dotted waveform 80 of line $j$ of FIG. 5 correspond to the output waveforms produced when the larger amplitude control waveforms 74 and 76, respectively, are applied. Note that the circuit oscillations rapidly begin to build up at a time $t_3$. The time interval between $t_0$ and $t_3$ is shorter than the time interval between the times $t_0$ and $t_1$, when smaller amplitude control signals are used. In practice, the time interval $t_0$–$t_3$ may be five or more times smaller than the time interval $t_0$–$t_1$. Also, note that the exponential build-up time between the times $t_3$ and $t_4$ of the output waveforms of line $j$ is approximately the same as the exponential build-up time $t_1$–$t_2$ of line $h$ when smaller amplitude control signals are applied. Thus, the time lag occurring between the application of a control signal and the start of the build-up of the circuit oscillations is a direct function of the amplitude of the control signals. Once the oscillations begin to build up, however, the build-up time is relatively independent of the amplitude of the control signal.

Accordingly, if the A.C. supply source 30 is operated to apply supply signals to the circuit only between the times $t_0$ and $t_1$ of FIG. 5, the circuit does or does not produce an output signal depending upon the presence or absence of a control signal of suitable amplitude. If the control signal is present, a burst of output signals is applied to the output circuit between the times $t_3$ and $t_1$. If the control signal is absent no output signals are produced.

A suitable A.C. supply gate 88 is shown in FIG. 6 by the pair of pentode tubes 90 and 92 connected in push-pull to the center-tapped primary winding 93 of an output transformer 94. A suitable tube power supply, such as a battery 95, is connected between ground and the center-tap of the primary winding 93. The secondary winding 96 of the output transformer 94 may be used as the primary winding 36 (FIG. 1) of the oscillator circuit 20. The A.C. supply source 30 is transformer coupled to the control grids of the tubes 90 and 92 by means of an input transformer 98. The cathodes and suppressor grids of the tubes 90 and 92 are grounded through a negative bias source such as a battery 99. When a negative-going gating signal, such as the negative pulse 100, is applied to the screen grids of the tubes 90 and 92, the tubes are made non-conductive and the A.C. supply signals from the source 32 are blocked from the output terminal 97. In the absence of a negative gating pulse 100, the tubes 90 and 92 alternately conduct to gate the A.C. supply signals to the output terminal 97.

Another A.C. supply gate 88′ of FIG. 7 uses a pair of parametric oscillator circuits 85 and 86. The outputs of the circuits 85 and 86 are coupled in mutually opposite senses by means of the primary windings 83 and 84 of a transformer 81. The gating circuit output is supplied across the secondary winding 82 of the transformer 81. The A.C. supply source 32′ applies A.C. signals to both oscillator circuits 85 and 86. A bias source 87 applies A.C. bias signals of one phase to the second oscillator circuit 86. Control signals of the opposite phase are applied from a control source 89 to the first oscillator circuit 85. The supply source 32′ is provided with a control input 33.

In operation, the A.C. supply source 32′ is operated as a "clocking" source to produce a series of bursts of output signals 101 in response to a series of control signals 100′. The spacing between successive bursts 101 is made such that the oscillator 85 does not begin spontaneous oscillation in the absence of a control signal 102. The oscillator 86 continually receives a bias signal and so becomes oscillating each time a burst of A.C. supply signals 101 is received. If the control signal 102 is absent during any burst, the output signals from the oscillator 86 appear as a burst of output signals 103 across the secondary winding 82 of the transformer 81. If the control signal 102 is present during the burst 101 of A.C. supply, both the oscillators 85 and 86 begin oscillating. The oscillator outputs, however, cancel each other due to the opposite sense linkage of the primary windings 83 and 84 and no output burst 103 is produced. Accordingly, when a control signal 102 is present during any time interval, the A.C. supply gate does not produce any output burst, and when a control signal 102 is absent during any time interval, a burst 103 of output signals are produced.

The logic circuit 110 of FIG. 8 is operated to apply a burst of output signals under the control of various information signals. For convenience of illustration, only two input control signals "A" and "B" are shown in FIG. 8. Also, a bias signal may be used as an additional control for the logic circuit 110. Recall that the phase of the output signals, when generated, corresponds to the phase of the control signals. Each control signal may be a three-valued function. One value of the function is represented by the absence of the control signal at a given time, termed a "0" signal, another value is represented by the presence of the control signal in one phase during the given time, termed a "1" signal, and the third value is represented by the presence of the control signal in the opposite phase during the given time, termed a "−1" signal.

The tables of FIGS. 9 and 10 represent the output functions generated by the logic circuit 110 of FIG. 8 when a bias signal in the one phase (FIG. 9), and in the opposite phase (FIG. 10) is applied to the logic circuit 110. Each of the control signals is of sufficient amplitude to cause the circuit 110 to begin oscillating within the time interval $t_0$–$t_1$ FIG. 5. The A.C. supply signals are gated to the logic circuit 110 between the times $t_0$ and $t_1$. In FIGS. 9 and 10, a "1" corresponds to an output burst in the one phase, a "−1" corresponds to an output burst in the opposite phase, and a "0" corresponds to the absence of an output burst.

Figure 11:
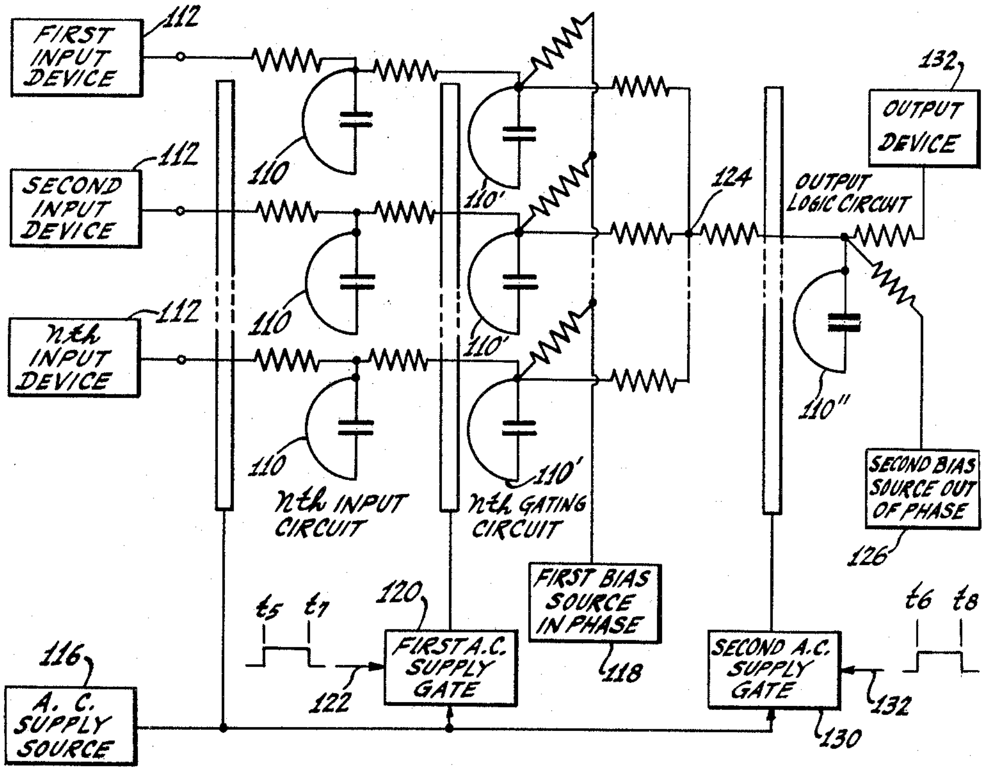
FIG. 11 is a schematic diagram of an "$n$" input gating circuit according to the present invention.

A plurality of the logic circuits of FIG. 8 can be interconnected to perform logical switching functions. For example, in FIG. 11 the "$n$" oscillator circuits 110 of the first column are used to apply "$n$" separate gating control signals to the $n$-input gating circuit of the second column. The gating circuits of the second column may be used as an $n$-input "or" circuit or as an $n$-input "and" circuit. An "or" circuit provides an output when one or more of the "$n$" input signals are present; and an "and" circuit provides an output only when all the "$n$" input signals are received. The "$n$" separate input signals to the gating circuit are applied by "$n$" oscillator circuits 110 each coupled to a different one of the oscillator circuits 110′ of the second column. The oscillator circuits 110 of the first column may be controlled individually by "$n$" separate input devices 112. At any one time, an oscillator circuit 110 may be oscillating in either phase "A" or phase "B," or not oscillating. An A.C. supply source 116 is coupled to all the circuits 110 of the first column. A first bias source 118 is coupled to all the oscillator circuits 110′ of the gating circuit. The A.C. supply source 116 is coupled to all the oscillator circuits 110′ via an A.C. supply gate 120 having a control input 122. The separate outputs of the oscillator circuits 110′ are all coupled to an output junction 124.

In operation, the A.C. supply signals from the supply source 116 are continually applied to the oscillator circuits 110 of the first column. Thus, any one circuit 110 of the first column is oscillating in either the "A" or the "B" phase depending on the phase of the control signals from the separate input devices 112. The "A" and "B" phases correspond to the binary "1" and "0" signals. The oscillator circuits 110′ of the second column are normally not oscillating because the A.C. supply gate 120 normally blocks the A.C. supply signals from the source 116. Between the times $t_5$ and $t_7$, a control signal is applied to the control lead 122 of the A.C. supply gate 120. This control signal unblocks the A.C. supply gate 120 and a burst of A.C. signals is applied to all the oscillator circuits 110′ of the second column. During the burst of A.C. supply signals from the gate 120, each of the oscillator circuits 110′ operates as a two-input "and" circuit. One input is a bias input applied to all the oscillator circuits 110′ from the first bias source 118. The second input is a control input signal from the connected first column oscillator circuit 110. Any one oscillating circuit 110′ begins oscillating only when both these input signals are present in the same phase, say the phase "A." When a control input signal to any one gating circuit 110′ is in the "B" phase, the "B" phase control input and "A" phase bias input cancel each other, and that one circuit 110′ does not begin oscillating. Also, the "A" phase bias signals alone are of insufficient amplitude to cause any of the circuits 110′ to begin oscillating. Accordingly, when any one of the "$n$" inputs to the oscillating circuits 110′ is in the phase "A," a burst of output signals is generated by that one oscillating circuit 110′. Thus, the second column of oscillating circuits 110′ operates as an $m$-input "or" gate. The output signal burst appears at the output junction 124.

An output gating circuit 110″ is provided to convert the output information appearing at the output junction 124 to the original "A" and "B" phases. The output gating circuit 110″ has one control input connected to the junction 124 and another input connected to a second bias source 126. The A.C. signals from the A.C. source 116 are gated to the output gating circuit 110″ by a second A.C. control gate 130 having a control input 132 for receiving control signals. The control signals are applied to the second A.C. gating circuit 130 between the time interval $t_6$–$t_8$ which overlaps the time interval $t_5$–$t_7$ of operation of the first A.C. gating circuit 120. The burst of output signals from the output circuit 110″ is applied to any suitable output device 132.

During operation, second bias source 126 applies phase "B" bias signals to the output gating circuit 110″. Thus, the output gating circuit 110″ is biased in the phase "B," opposite from the biasing of the oscillating circuits 110′. The phase "B" bias signals are of sufficient amplitude to produce a burst of output signals during the time interval $t_6$–$t_8$ in the absence of an output signal at the output junction 124. If a phase "A" signal appears at the junction 124, it is of sufficient amplitude to overcome the "B" phase bias signal and to cause the output circuit 110″ to begin oscillating in the "A" phase during the time interval $t_6$–$t_8$. Thus, the output circuit 110″ provides a phase "B," or a phase "A" output depending upon whether none, or whether at least one of the inputs to the $n$-input gating circuit is an "A" phase input.

The $n$-input "or" circuit can be operated as an $n$-input "and" circuit by operating the first and second bias sources 118 and 126 to provide "B" and "A" phase signals, respectively. Now, when all the oscillating circuits 110′ have "A" phase inputs, no burst of output signals appears at the junction 124 during the time interval $t_5$–$t_7$. Accordingly, the output circuit 110″ produces an "A" phase output indicating that all the oscillating circuits 110′ have received "A" phase inputs. When any one or more of the oscillating circuits 110′ receives a "B" phase input, a "B" phase output is provided at the junction 124 between the times $t_5$–$t_7$. This "B" phase output overrides the "A" bias applied to the output gating circuit 110″ and causes the output gating circuit 110″ to produce a "B" phase output during the time interval $t_6$–$t_8$. Thus, by reversing the phases of the bias signals from the bias sources 118 and 126, the gating circuit can be made to function either as an $n$-input logical "or" or as an $n$-input logical "and" gate.

Figure 12:
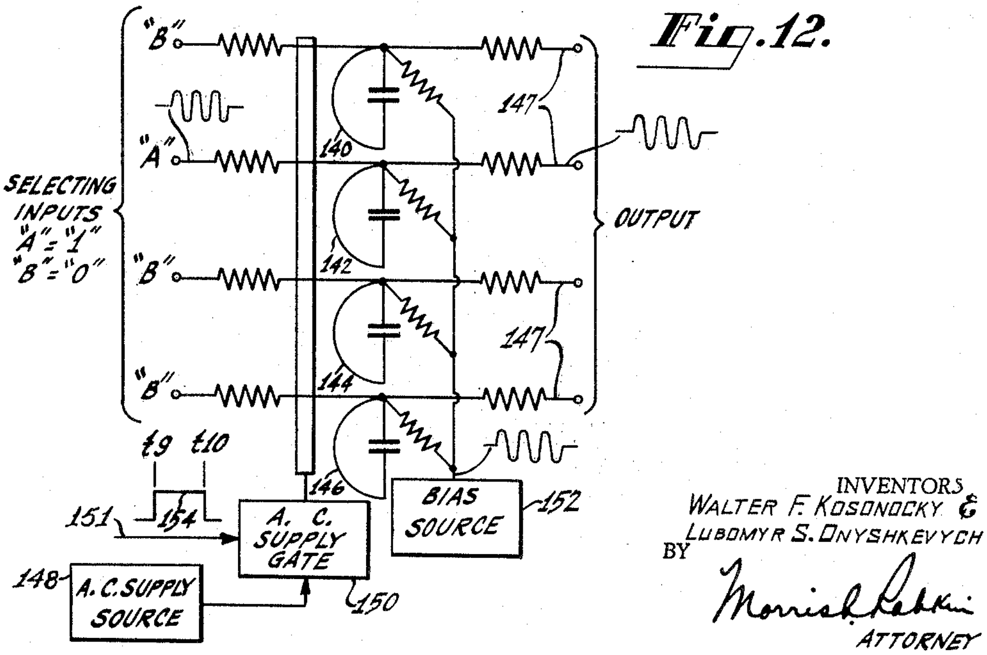
FIG. 12 is a schematic diagram of a combinatorial selection circuit according to the present invention.

The combinatorial selecting network of FIG. 12 has, for example, four oscillator circuits 140, 142, 144 and 146 for coupling four separate input devices, not shown, to four separate output channels 147. A.C. supply signals are applied to all the oscillator circuits 140–146 from an A.C. supply source 148 via an A.C. supply gate 150. A control lead 151 is provided for the A.C. supply gate 150. A common bias source 152 is coupled to all the oscillator circuits. In operation, the bias source 152 applies signals in one phase, for example, the phase "A." Signals in either the phase "A" or in the phase "B," are applied selectively to the separate inputs of the oscillator circuits 140–146.

In operation, a control signal 154 applied to the A.C. supply gate 150 between the times $t_9$ and $t_{10}$ couples the A.C. signals from the A.C. supply source 148 to the oscillator circuits 140–146. The "A" phase signals from the bias source 152 are of insufficient amplitude to cause any of the circuits 140–146 to begin oscillating within the time interval $t_9$–$t_{10}$. However, the "A" phase bias signal in conjunction with an "A" phase input signal are sufficient to cause an oscillator circuit 140–146 to produce output signals within the time interval $t_9$–$t_{10}$. Thus, as shown in FIG. 12, when an "A" phase signal is applied to the second oscillator circuit 142, an output signal is transmitted to the second output channel 147 during the time interval $t_9$–$t_{10}$. None of the other output channels 147 receives any output signals between the times $t_9$–$t_{10}$ since, as shown in the drawings, each of the other oscillator circuits 140, 144 and 146 have "B" phase signals applied to their control inputs. At the time $t_{10}$ the A.C. signals are removed by terminating the gating signal 154 and the oscillating circuit 142 ceases oscillation.

In similar manner, any other of the output channels 147 can be selected to receive a burst of output signals by applying an "A" phase control signal to its coupled oscillating circuit during the time interval $t_9$–$t_{10}$. The selecting inputs may be coupled in various combinatorial arrangements to the different oscillating circuits 140–146 for selecting the one or more output channels 147 to receive a burst of output signals during the time interval $t_9$–$t_{10}$.

There have been described herein improved switching systems using parametric oscillating circuits to provide various switching and logical operations on information signals. Also described are novel methods of operating a parametric oscillating circuit to obtain a burst of signals representing information.

What is claimed is:

1. A switching system comprising a parametric oscillator circuit having a control input, an A.C. signal input, and an output, means for applying a control signal to said control input, means for applying A.C. signals to said signal input, said A.C. signals being applied for a given maximum time interval, said circuit either oscillating or not oscillating in response to said A.C. signals in accordance with the amplitude of said control signal, and means for controlling the duration of said A.C. signals to said given, maximum time interval.

2. A switching system comprising a parametric oscillator circuit having a control input and an A.C. signal input, means for applying a burst of A.C. signals to said A.C. input, means for applying a control signal of either relatively small or relatively large amplitude to said control input, said circuit becoming oscillating only when said relatively large amplitude control signal is applied, and means for controlling the duration of said burst of said A.C. signals to a given, maximum time interval.

3. A switching system comprising a plurality of parametric oscillator circuits each having a first and a second control input and an A.C. supply input, means for applying a burst of A.C. signals to said A.C. supply input of all said circuits, means for applying a first control signal of one phase to said first control input of all said circuits, means for applying a second control signal of said one phase to said second control input of a selected one of said circuits, and means for controlling the duration of said A.C. signals to a given, maximum time interval whereby said selected circuit becomes oscillating to produce a burst of output signals of said one phase.

4. A switching system comprising a plurality of parametric oscillator circuits each having a first and a second control input and an A.C. supply input, each of said circuits initially being in a non-oscillating condition, means for applying a burst of A.C. signals to said A.C. supply inputs of all said circuits, and means for controlling the duration of said burst of A.C. signals to a given, maximum time interval, means for applying a first control signal of one phase to said first control input of all said circuits, and means for applying a second control signal of said one phase to said second control input of one or more of said circuits, whereby said one or more circuits change from said non-oscillating condition to an oscillating condition.

5. A switching system comprising a plurality of parametric oscillator circuits each having a first and a second control input and an A.C. supply input, each of said circuits initially being in a non-oscillating condition, means for applying a burst of A.C. signals to said A.C. supply inputs of all said circuits, and means for controlling the duration of said burst of A.C. signals to a given, maximum time interval, means for applying a first control signal of one phase to said first control input of all said circuits, and means for applying other control signals to said second inputs of all said circuits, certain of said other signals being of said one phase and the remaining of said other signals being of the phase opposite said one phase, whereby said circuits receiving said certain other signals change from said non-oscillating to an oscillating condition.

6. A switching system comprising a plurality of parametric oscillator circuits, means for applying a burst of A.C. signals to all said circuits, and means for controlling the duration of said burst of A.C. signals to a given, maximum time interval, means for applying a bias control signal of one phase to all said circuits, and means for applying an additional signal of said one phase to a selected one or more of said circuits, said selected one or more circuits producing output signals only when all said signals are present at the same time.

7. A switching system comprising first and second parametric oscillators each having a control input and each being linked by an output winding, said output windings being connected to each other in mutually opposite senses, means for applying bursts of A.C. supply signals to both said oscillator circuits, means for controlling the durations of said bursts of A.C. supply signals to a given, maximum time interval, means for applying an A.C. bias signal in one phase to said first oscillator circuit, and means for selectively applying A.C. control signals of said one phase and the same frequency as said bias signal to said second oscillator circuit, said circuit either oscillating or not oscillating in response to said A.C. supply signals in accordance with the amplitude of said control signals.

8. A switching system as claimed in claim 7, including a transformer for coupling said output windings and a further output winding coupled to said transformer.

9. A switching system comprising first and second parametric oscillator circuits, means for applying bursts of A.C. signals to said oscillator circuits, means for controlling the durations of said bursts of A.C. supply signals to a given, maximum time interval, means for applying a signal of one phase to said first oscillator circuit, and means for applying other signals of said one phase to said second oscillator circuit and an output means coupled in mutually opposite senses to said first and second oscillator circuits, said system providing an output signal only when said one phase signals are so applied at the same time.

10. A switching system comprising a parametric oscillator circuit, means for applying bias signals of one phase to said oscillator circuit, means for selectively applying first signals to said oscillator circuit, means for selectively applying second signals to said oscillator circuit, each of said first and second signals having one of two different phases, said signals being of one frequency, means for applying bursts of A.C. supply signals to said oscillator circuit, and means for controlling the durations of said bursts of A.C. supply signals to a given, maximum time interval.

11. A switching system as claimed in claim 10, wherein said circuit provides an output when either one or both of said first and second signals are present during said A.C. supply burst.

12. A switching circuit comprising a parametric oscillator circuit, means for applying selectively first and second signals respectively of one phase and of the phase opposite the one phase to said oscillator circuit, and means for applying selectively bursts of A.C. supply signals to said circuit, and means for controlling the durations of said burst of A.C. supply signals to a given, maximum time interval.

13. A switching system as claimed in claim 12, said oscillator circuit providing an output signal when and only when both said first and second signals are present in the same phase during a burst of said A.C. signals.

14. A switching system as claimed in claim 12, wherein said circuit provides an output signal when both said first and second signals are present in the same phase during a burst of said A.C. supply signals or when one of said first and second signals is present and the other is absent during said burst of A.C. supply signals.

15. An $n$-input logic circuit comprising $n$ parametric oscillator circuits each having a bias and a control input, means for applying bias signals of one phase to all said bias inputs, means for applying selectively control signals of either said one phase or the phase opposite said one phase to respective ones of said control inputs, means for applying bursts of A.C. signals to said circuits, means for controlling the duration of said bursts of signals to a given, maximum time interval, an output junction, and means coupling all said oscillator circuits to said output junction.

16. An $n$-input logic circuit comprising a plurality of parametric oscillator circuits each having a control input, means for applying bias signals of one phase to all said oscillator circuits, means for applying bursts of A.C. signals to said circuits, means for controlling the durations of said bursts of said A.C. signals to a given, maximum time interval, means for applying individual control signals to the said control inputs of individual ones of said oscillator circuits, said control signals being of either one phase or in the phase opposite said one phase, an output junction, each of said oscillator circuits being coupled to said output junction, a signal of said one phase appearing at said output junction when any one of said applied control signals is in the said one phase.

17. An $n$-input logic circuit comprising "$n$" parametric oscillator circuits each coupled to a different one of said $n$-inputs, a first bias source coupled to all said "$n$" oscillator circuits, an output oscillator circuit coupled to all said "$n$" oscillator circuits, a second bias source coupled to said output oscillator circuit, means for applying bursts of A.C. supply signals simultaneously to all said oscillator circuits, and means for controlling the durations of said bursts of A.C. supply signals to a given, maximum time interval.

18. The method of operating a parametric oscillator circuit comprising the steps of applying a burst of A.C. supply signals of a given duration to said oscillator circuit, and concurrently applying control signals having an amplitude greater than a minimum value to said oscillator circuit, whereby output signals are produced by said oscillator circuit only when said concurrently applied control signals exceed said minimum amplitude.

19. The method of operating a parametric oscillator circuit comprising the steps of applying a burst of A.C. supply signals to said oscillator circuit, and concurrently applying to said oscillator circuit one or more control signals, whereby said oscillator circuit produces a burst of output signals when and only when the net value of said applied control signals is above a threshold value related to the time interval of said burst of A.C. signals.

20. The method of operating a parametric oscillator circuit comprising the steps of applying a burst of A.C. supply signals to said circuit for a given time interval, and applying one or more control signals to said oscillator circuit during said interval, said oscillator circuit providing a burst of output signals in one of two phases when the net amplitude of said control signals in said one phase exceeds a threshold amplitude, said oscillator circuit providing a burst of output signals in the phase opposite said one phase when the net amplitude of said applied control signals exceeds said threshold amplitude in the said opposite phase, and said oscillator circuit producing no output signals when the net amplitude of said applied control signals is below said threshold amplitude.

References Cited by the Examiner

UNITED STATES PATENTS 2,928,008 3/60 Hidetosi Takahasi et al. __ 307—88

FOREIGN PATENTS 778,883 7/57 Great Britain.

IRVING L. SRAGOW, *Primary Examiner.*

EVERETT R. REYNOLDS, JOHN T. BURNS, *Examiners.*